United States Patent
Zhou et al.

(10) Patent No.: US 9,081,458 B2
(45) Date of Patent: Jul. 14, 2015

(54) IN-CELL TOUCH DISPLAY DEVICE

(71) Applicant: Shanghai Tianma Micro-Electronics Co., Ltd., Shanghai (CN)

(72) Inventors: Xingyao Zhou, Shanghai (CN); Qijun Yao, Shanghai (CN); Lihua Wang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 65 days.

(21) Appl. No.: 14/089,650

(22) Filed: Nov. 25, 2013

(65) Prior Publication Data

US 2014/0176490 A1 Jun. 26, 2014

(30) Foreign Application Priority Data

Dec. 25, 2012 (CN) .......................... 2012 1 0573130

(51) Int. Cl.
*G09G 3/36* (2006.01)
*G06F 3/044* (2006.01)
*G06F 3/041* (2006.01)

(52) U.S. Cl.
CPC .............. *G06F 3/044* (2013.01); *G06F 3/0412* (2013.01); *G09G 3/36* (2013.01)

(58) Field of Classification Search
USPC .................................. 345/174, 87, 173, 156; 178/18.01–18.09; 349/139
See application file for complete search history.

(56) References Cited

U.S. PATENT DOCUMENTS

| 8,102,498 B2 * | 1/2012 | Kanaya et al. ................. 349/155 |
| 2008/0062140 A1 * | 3/2008 | Hotelling et al. ............. 345/173 |
| 2009/0096765 A1 * | 4/2009 | Kuo et al. ....................... 345/174 |
| 2010/0026655 A1 * | 2/2010 | Harley ........................... 345/174 |

* cited by examiner

*Primary Examiner* — Shaheda Abdin
(74) *Attorney, Agent, or Firm* — Kilpatrick Townsend & Stockton LLP

(57) ABSTRACT

An in-cell touch display device is disclosed. The device includes a color filter substrate, a Thin Film Transistor array substrate, and a liquid crystal layer disposed between the color filter substrate and the Thin Film Transistor array substrate. The color filter substrate includes a grid black matrix layer, a touch layer, and a color filter layer, where the touch layer includes a plurality of metal grid electrodes. In addition, each electrode is aligned with the grid of the black matrix layer in a light transmission direction, and a density of the metal grid electrodes adjacent to the edge of the metal grid electrodes is greater than a density of the metal grid electrodes adjacent to the center of metal grid electrodes.

12 Claims, 6 Drawing Sheets

IN-CELL TOUCH DISPLAY DEVICE

CROSS-REFERENCES TO RELATED APPLICATIONS

The present application claims the benefit of priority to Chinese patent application No. 201210573130.5, entitled "IN-CELL TOUCH DISPLAY DEVICE", filed with the Chinese Patent Office on Dec. 25, 2012, the contents of which is incorporated herein by reference in its entirety.

TECHNICAL FIELD

The present invention relates to touch technologies, and in particular to a liquid crystal display device with a built-in touch panel.

BACKGROUND OF THE INVENTION

A touch display screen is one of important carriers which integrates an input terminal and an output terminal. In recent years, the market demand for touch display screens is boosting alone with the emergence of series of compact light-weight handheld devices such the iPhone. Previous touch display screens each are realized by superposing a touch panel on a display screen. That is, to prepare a touch display screen, a display device and a touch panel are prepared separately and then assembled to form the touch display device, which results in a relatively high cost and a bulk display screen and does not meet the present needs for a light-weight and thin display device.

An in-cell touch display screen is less in weight but more convenient in that its display device and touch panel are formed integrally, and hence draws attentions of many people. Many researchers and developers are attempting to improve the performance of the in-cell touch display screen to satisfy actual requirements. Chinese patent application No. CN102541134A discloses a touch display device and a manufacturing method thereof, and the touch display device includes: a touch panel substrate including a touch structure layer and output lead wires of the touch structure layer, and a pixel array substrate provided with a pixel array and peripheral lead wires of the pixel array, where the output lead wires of the touch structure layer overlap the peripheral lead wires of the pixel array in a light transmittance direction. The touch display device further includes a first shielding layer disposed between drive lead wires and the peripheral lead wires of the pixel array; and a second shielding layer disposed between sense electrode lead wires and the peripheral lead wires of the pixel array. The shielding layers decrease the parasitic capacitance between the peripheral lead wires of the pixel array substrate and the output lead wires of the touch panel substrate, thus prevents the drive electrodes and the sense electrodes of the touch panel from coupling with each other through the parasitic capacitance, and hence increasing the signal-to-noise ratio.

In the prior art, although the parasitic capacitance caused by the output lead wires of the touch structure layer is decreased by shielding the output lead wires, the parasitic capacitance between the drive electrodes and the sense electrodes in the touch structure layer and the display device also significantly impacts the touch effect. Referring to FIGS. 1 and 2 in particular, FIG. 1 is a schematic view of a mutual capacitive touch display device in the prior art. And FIG. 2 is an equivalent circuit diagram of the mutual capacitive touch display device shown in FIG. 1.

The touch structure layer, which is multilayered, includes a drive electrode layer 0041, a sense electrode layer 0042, and an insulation layer disposed between the drive electrode layer 0041 and the sense electrode layer 0042. The drive electrode layer 0041, the sense electrode layer 0042 and the insulation layer are disposed to overlap each other. FIG. 2 shows structures of both the drive electrode layer 0041 and the sense electrode layer 0042.

The drive electrode layer 0041 includes a plurality of rhombic drive electrodes 00410 extending along a direction Y and connecting with each other to form drive lines, each of which is connected to an external signal 00411. The sense electrode layer 0042 includes a plurality of rhombic sense electrodes 00420 extending along a direction X and connected through metal bridges to form sense lines, each of which is connected to an external signal 00421. A gap exists between the drive electrodes 00410 and the sense electrodes 00420 to insulate the drive electrodes from the sense electrodes.

Meanwhile, in the touch liquid crystal display device of the prior art, both the drive electrodes and the sense electrodes overlap with pixel electrodes, data lines and scan lines on the array substrate, thus generating a parasitic capacitance due to such overlapping. FIG. 2 is an equivalent circuit of a traditional touch liquid crystal display device. As shown, an alternating current power supply 101 is connected to a drive line 102. The drive line 102 with a certain length is equivalent to a resistor. A mutual capacitance 103 is formed by the drive electrode and the sense electrode at their intersection, and the size of the mutual capacitance 103 changes when a touch occurs. Additionally, a parasitic capacitance 105 is formed between the drive electrode or the sense electrode and the other conducting layers.

A detecting method of the traditional mutual capacitive touch panel includes scanning each drive line 102 in sequence, i.e., applying a drive voltage 101 to each drive line 102 in sequence while the remaining drive lines are grounded, and connecting each sense line 104 on the detecting side to a detecting unit 106 to detect a signal on each sense line 105. When a finger as a conductor touches the surface of the touch panel, the mutual capacitance 103 at the touched position is changed by the capacitive sense effect of the finger. Such change can be detected by the detecting unit 106 to determine whether the touch panel is touched by the finger and where the touch occurs.

In the case a large parasitic capacitance 105, the drive signal is severely deformed. In the touch liquid crystal display device, the touch layer is close to the conductive layers such as the pixel electrodes, the data lines and the scan lines on the array substrate, causing very large parasitic capacitances that are disadvantageous for the detection of a touch signal. Furthermore, as described above, in order for light transmittance through the touch liquid crystal display device, the touch layer must employ a film made of a light-transparent material such as ITO, and the resistivity of the ITO film is significantly larger than a common metal to achieve the large resistance of the touch layer, so that the detecting sensitivity of the touch layer is reduced and the load of the touch layer is increased. Therefore, as for the touch liquid crystal display device, many problems such as decreasing the resistance and parasitic capacitance, improving light transmittance, and improving the display effect need to be solved.

Besides, if the size and the resolution of the touch panel are increased, more electrodes and lead wires are required and the above problems get more severe. Therefore, the area and resistance of the touch electrode in the in-cell touch structure need to be further optimized to meet the requirements for the in-cell touch structure. Therefore, it is essential to decrease the resistance and capacitance to solve these problems of the in-cell touch structure.

BRIEF SUMMARY OF THE INVENTION

One inventive aspect is an in-cell touch display device. The device includes a color filter substrate, a Thin Film Transistor array substrate, and a liquid crystal layer disposed between the color filter substrate and the Thin Film Transistor array substrate. The color filter substrate includes a grid black matrix layer, a touch layer, and a color filter layer, where the touch layer includes a plurality of metal grid electrodes. In addition, each electrode is aligned with the grid of the black matrix layer in a light transmission direction, and a density of the metal grid electrodes adjacent to the edge of the metal grid electrodes is greater than a density of the metal grid electrodes adjacent to the center of metal grid electrodes.

DETAILED DESCRIPTION OF THE PREFERRED EMBODIMENTS

The present invention will be described in more detail in conjunction with the accompanying drawings and embodiments of the present invention. It shall be understood that the embodiments described here are intended to explain but not limit the present invention. It shall be further noted that the drawings show only a related part of the invention, but not all of the invention.

A First Embodiment

Figure 1:
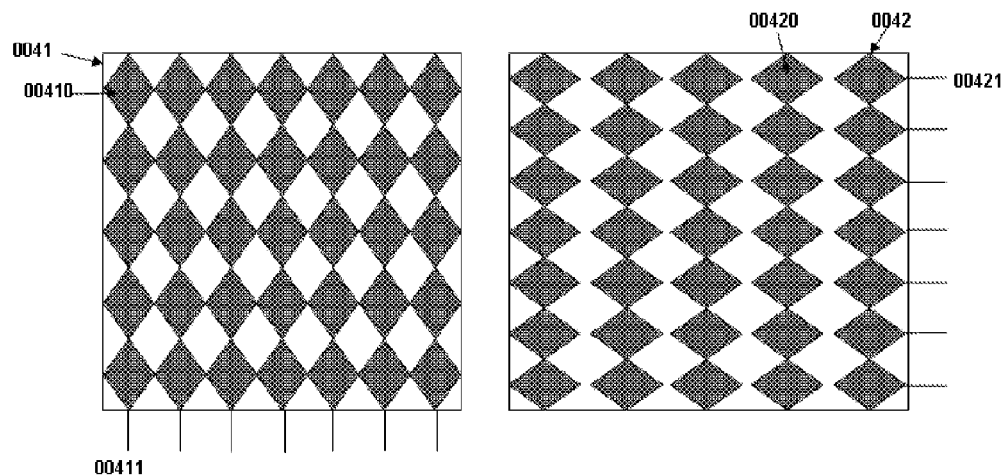
FIG. 1 is a schematic view of a mutual capacitive touch display device in the prior art.
Figure 2:
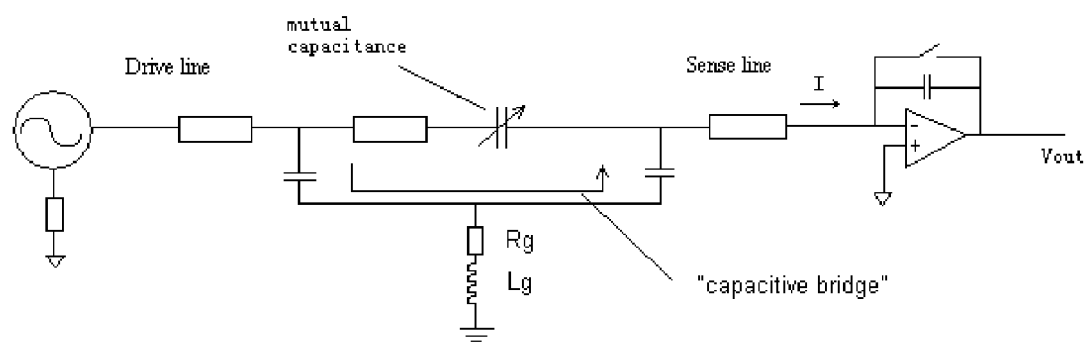
FIG. 2 is an equivalent circuit diagram of the mutual capacitive touch display device shown in FIG. 1.
Figure 3:
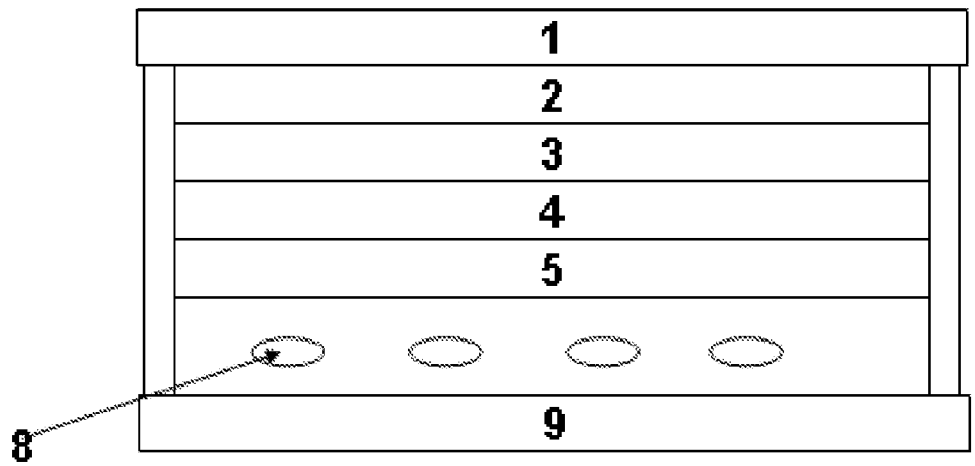
FIG. 3 is a schematic structural view of an in-cell touch display device provided by a first embodiment of the present invention.

A liquid crystal display device with a built-in touch panel is provided in the first embodiment. A schematic structural view of the liquid crystal display device is shown in FIG. 3. As shown, the liquid crystal display device include a color filter substrate, an array substrate 9, as well as a liquid crystal layer 8 and an organic layer 5 both disposed between the color filter substrate and the array substrate 9. The organic layer 5 is used as a protective layer. The color filter substrate includes a substrate 1 which is a glass substrate, a black matrix layer 2, a color filter layer 3, and a touch layer 4.

Figure 4:
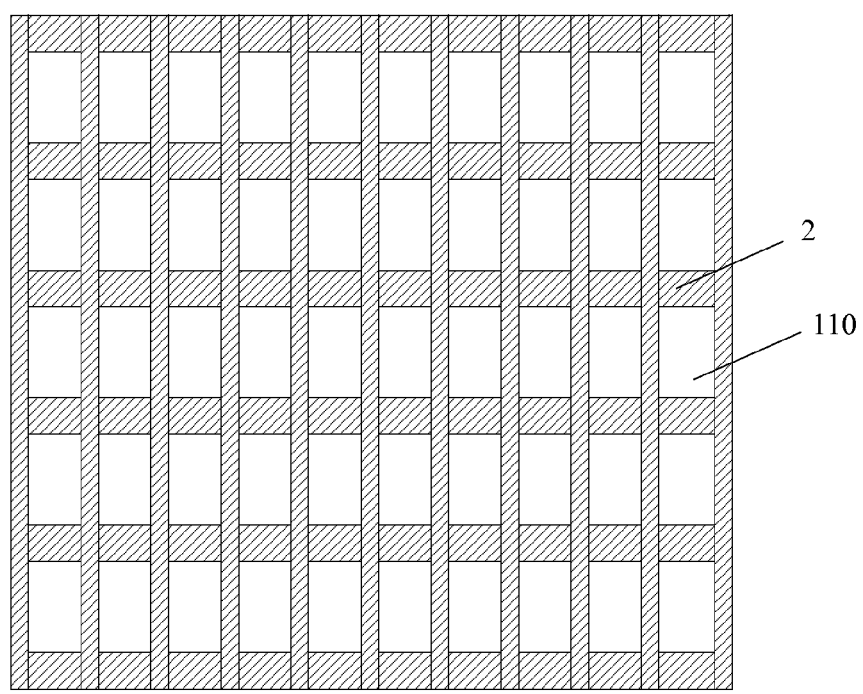
FIG. 4 is a schematic top view of a black matrix of the in-cell touch display device provided by the first embodiment of the present invention.

The top view of the black matrix layer is shown in FIG. 4. The black matrix layer 2 is constituted by an intersectional grid and is made of a common material, such as, chromium. As known by those skilled in this art, FIG. 4 shows only a portion of but not all of the black matrix layer on the substrate, and various modifications can be made to the shape of the black matrix layer 2. In a blank portion 110 defined by the intersectional grid, color resistance materials for forming red, green, and blue (RGB) sub-pixels respectively are deposited subsequently to form a color filter layer.

The color filter layer 3 is below the black matrix layer 2 and includes red, green, and blue sub-pixel units. Each pixel unit includes one red sub-pixel unit, one green sub-pixel unit, and one blue sub-pixel unit.

The touch layer 4, which is multilayered, includes a plurality of drive electrodes and a plurality of sense electrodes both of which are metal grid electrodes. The line width of the metal grid is small than the line width of the black matrix layer. In the light transmission direction, a projection of the metal grid electrode falls within a projection of the black matrix layer 2, that is, the black matrix layer 2 shields the drive electrode and the sense electrode in a light transmission direction, thus, the drive electrode and the sense electrode are invisible. Compared with the prior art, the touch layer has a lower resistance than the case where the touch layer is formed of ITO in that it's formed of a metal.

The line width of each metal grid of the drive electrode and the sense electrode may range from 0.1 μm to 10 μm. A density of the metal grids depends on pixel units in the color filter layer 3.

In order to reduce the resistance of the touch layer and parasitic capacitances formed by the touch layer along with other conductive layers, the metal grid electrodes are designed in such a way that: in the metal grid electrodes, a density of the metal grids adjacent to the edge direction of the metal grid electrodes is larger than that of the metal grids adjacent to the center direction of metal grid electrodes.

Figure 6:
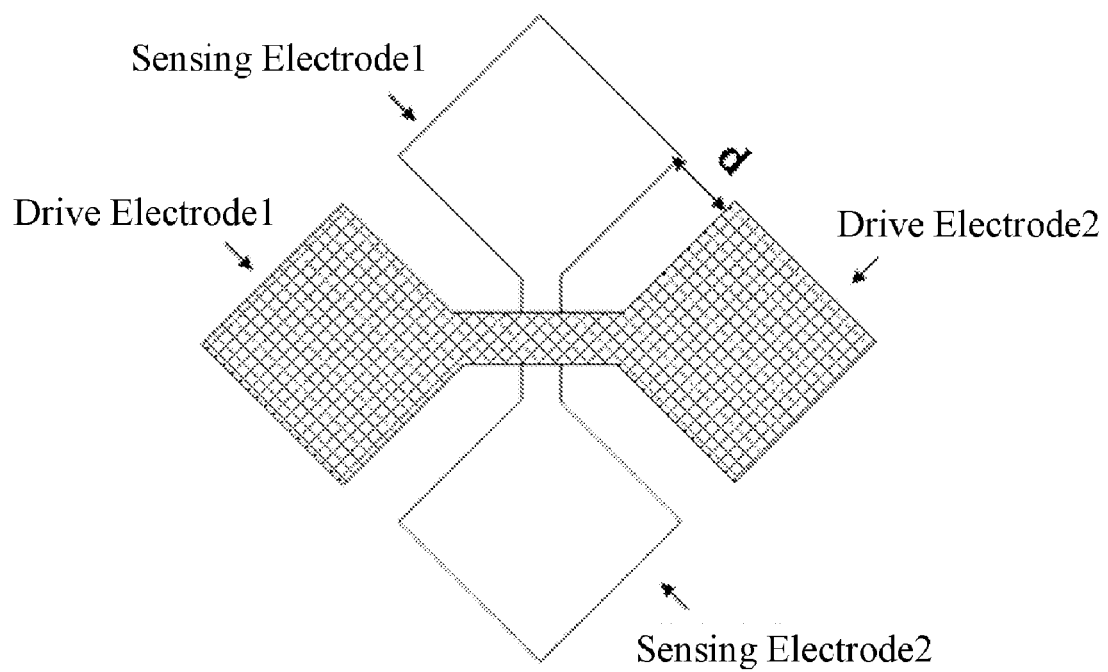
FIG. 6 is a schematic structural view of a pixel of the mutual capacitive touch panel.

The mutual capacitance between the sense electrode and the drive electrode adjacent to each other varies with the distance therebetween. Referring to FIG. 6 which shows a schematic structural view of a pixel of the mutual capacitive touch panel, the pixel includes two drive electrodes each having a diamond shape and two sense electrodes each having a diamond shape. The distance between the sense electrode and the drive electrode adjacent to each other is denoted by d. The mutual capacitance C between the drive electrode and the sense electrode satisfies the following formula:

$$c = 0.55e^{-0.35d} + \frac{0.75}{\sqrt{d}}$$

The above formula is an empirical formula in the prior art, and the mutual capacitance C decreases as the distance d between the sense electrode and the drive electrode adjacent to each other is increased according to the formula.

Figure 7:
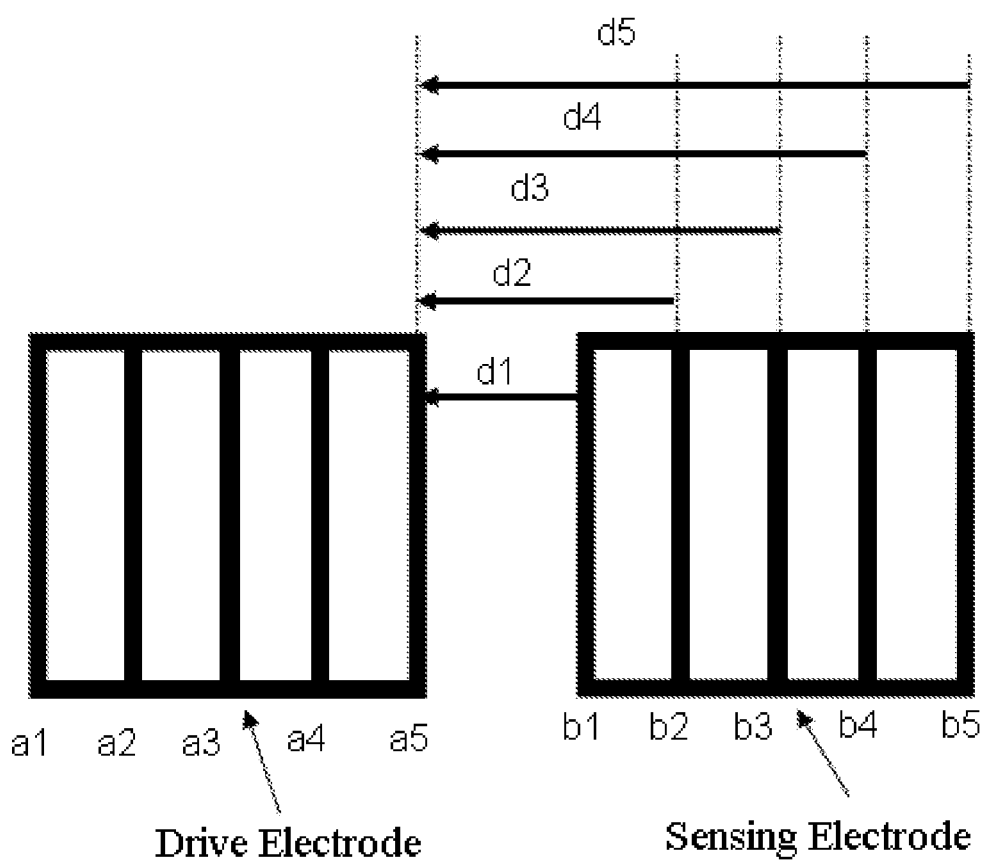
FIG. 7 is a schematic view of the drive electrode and the sense electrode formed by a metal grid structure in the mutual capacitive touch.

The inventor found that the above empirical formula for the case of diamond electrodes is also applicable in another case where the drive electrode and/or the sense electrode are both formed by metal grids. As specifically shown in FIG. 7, an example in which both the sense electrode and the drive electrode are in the shape of metal grids are described. As shown, both of the sense electrode and the drive electrode adjacent to each other are formed by grids constituted by a plurality of metal lines. The drive electrode includes metal lines a1, a2, a3, a4, and a5, while the sense electrode includes metal lines b1, b2, b3, b4, and b5. In the case of the metal line a5 of the drive electrode, for example, the distances between the metal line a5 and each of the metal lines b1, b2, b3, b4, and b5 of the sense electrode is d1, d2, d3, d4, and d5, respectively, from near to far. It can be seen from the above empirical formula that the mutual capacitance between the metal lines b1 and a5 is the largest, and the larger the distance between the metal line a5 and a metal line of the sense electrode is, the smaller the mutual capacitance them is. Likewise, the relation between the metal lines b1, b2, b3, b4, and b5 and each of the metal lines a4, a3, a2, and a1 is similar to the above. That is, in the drive electrode and the sense electrode formed by metal grids, if the distance between the metal lines is increased, the contributions of these metal lines to the mutual capacitance is decreased, but the resistance of each metal line is the same because the metal lines each have the same line width.

Accordingly, the in-cell touch display device proposed by the inventor of the present invention includes a plurality of metal grid electrodes within which the density of the metal grids adjacent to the edge direction of the metal grid electrodes is larger than that of the metal grids adjacent to the center direction of metal grid electrodes. In particular, in the embodiment one, both the sense electrode and the drive electrode are metal grid electrodes. At a place adjacent to the edge direction of the sense electrode and the drive electrode, a larger mutual capacitance can be formed by metal grids with a high density, while at a place adjacent to the center direction of the sense electrode and the drive electrode, density of the metal grids is low hence the resistance, the parasitic capacitance, and the load of the touch display device are reduced to make the detection more sensitive and to make energy consumption reduced.

Figure 5:
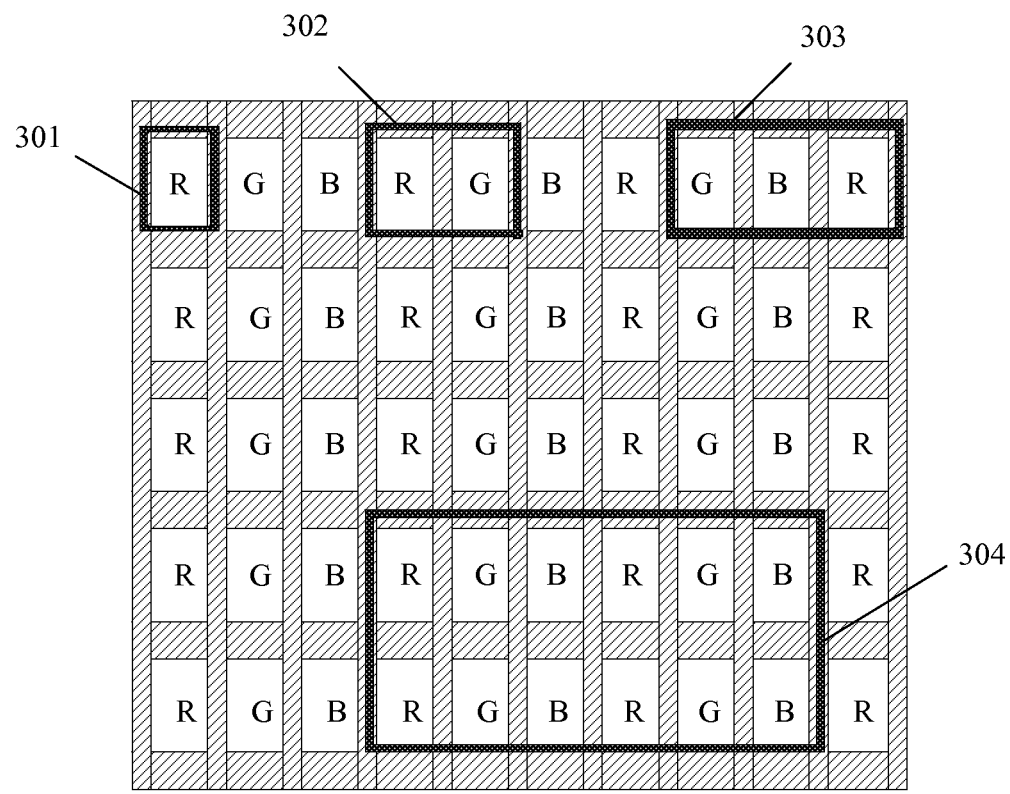
FIG. 5 is a schematic top view of metal grids of the in-cell touch display device provided by the first embodiment of the present invention.

The ratio of the density of the metal grids of the drive electrode or the sense electrode of the touch layer to the density of the sub-pixel units ranges from 1:1 to 1:12. As shown in FIG. 5, the smallest metal grid such as the metal grid 301 corresponds to one-third of a pixel unit, i.e. one sub-pixel unit. It is also possible that a metal grid such as the metal grid 302 in FIG. 5 corresponds to two-third of a pixel unit, i.e. two sub-pixel units. It is further possible that a metal grid such as the metal grid 303 in FIG. 5 corresponds to one pixel unit, i.e. three sub-pixel units. The ratio of the density of the metal grids to the density of the sub-pixel units may be designed to be 1:1, 1:2, 1:3, 1:4, 1:5, 1:6, 1:7, . . . , 1:12 and so on. That is, the metal grid is up to 12 times of the sub-pixel unit in size, i.e., one metal grid such as the metal grid 304 in FIG. 5 corresponds to twelve sub-pixel units.

It should be noted that, the touch layer 4 is below the color filter layer 3 in the first embodiment, but may be located above the color filter in other embodiments, as long as the touch layer is below the black matrix layer. In the light transmission direction, a projection of each metal grid electrode falls within the projection of the black matrix, so the touch layer may be shielded by the black matrix.

In other embodiments, the sense electrode may be configured to be the above said metal grid electrode, while the drive electrode may be configured to be a non-metal grid electrode; or alternatively, the drive electrode may be configured to be the above said metal grid electrode, while the sense electrode may be configured to be a non-metal grid electrode. In this way, in the metal grid electrodes, at a place where the density is larger a capacitance can be formed with the non-metal grid electrode, while at a place where density is smaller the resistance, the parasitic capacitance can be reduced to achieve a technical effect similar to that of the embodiment one.

A Second Embodiment

In an in-cell touch display device provided in the second embodiment, in the metal grid electrodes, the density of the metal grid electrodes decreases gradually from the edge direction of the metal grid electrodes to the center direction of the metal grid electrodes.

Figure 8:
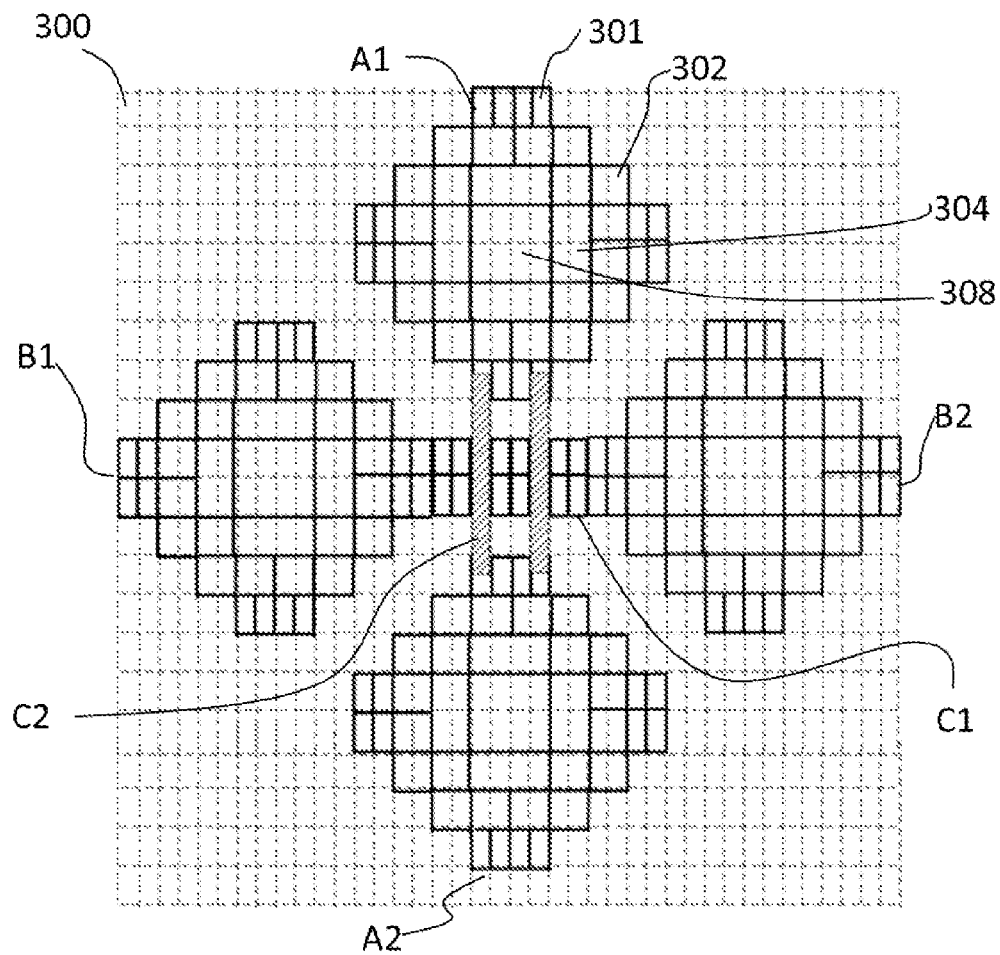
FIG. 8 a schematic top view of a touch unit of a liquid crystal display device provided by a second embodiment of the present invention.

FIG. 8 is an exemplary structural view of a preferred embodiment of a touch unit. As shown, the touch layer includes drive electrodes A1 and A2, as well as sense electrodes B1 and B2. The drive electrodes A1 and A2, and the sense electrodes B1 and B2 which compose one pixel structure of the touch layer are arranged adjacent to each other and made of metal grid electrodes. In the light transmission direction, projections of metal grid electrodes fall within the projection of the color filter of the black matrix. The color filter comprises a plurality of sub-pixel 300.

At a place adjacent to the edge direction of the metal grid electrode, the density of the metal grids is the maximal. For example, at the outmost ring of the drive electrode A1, the ratio of the density of the metal grids of the drive electrode A1 to the density of the sub-pixel 300 is designed to be 1:1. At another place a bit far away from the edge, the density of the metal grids 302 of each electrode is slightly decreased. At such place, the ratio of the density of the metal grids 302 of the drive electrode A1 to the density of the sub-pixel is designed to be 1:2, that is, one metal grid corresponds to two sub-pixels.

At still another place farther away from the edge, the density of the metal grids 304 of the drive electrode A1 reduces furthermore, with the ratio of the density of the metal grids of the metal grids 304 to the density of the sub-pixel to be 1:4, that is, one metal grid corresponds to 4 sub-pixels. In the center of the drive electrode A1, the density of the metal grids 306 is minimal, with the ratio of the density of the metal grids of the metal grids 308 to the density of the sub-pixel 300 to be 1:8, that is, one metal grid corresponds to 8 sub-pixels.

Designs for metal grids of the drive electrode A2, the sense electrode B1 and the sense electrode B2 are the same to that of the drive electrode A1. That is, in each electrode, the density of the grids decreases gradually from the edge direction of the electrodes to the center direction of the electrodes.

In this way, it is ensured that, at the place where the sense electrode and the drive electrode are close to each other, the density of the metal grids is large enough to form a mutual capacitance between the metal grids, further, the mutual capacitance formed between the metal grids reduces quickly as the distance increases. Therefore, at the place where the sense electrode and the drive electrode are farther to each other, the contribution of the metal grids to the mutual capacitance is not considered, and the resistance form by the metal grids can be decreased if the density of the metal grids is reduced.

In the above embodiment, each of the drive electrodes A1-A2 and the sense electrodes B1-B2 has a diamond shape, for example. However, in other embodiments, those skilled in this art may select an electrode with any other shape, and select the size of the metal grid and the number of metal grids in a touch unit, without departing from the protecting scope of the present invention.

In the second embodiment, the touch layer in the in-cell touch display device includes a first metal layer, a second metal layer, and an insulation layer between the first metal layer and the second metal layer. The first metal layer of the touch layer includes drive electrodes A1 and A2, sense electrodes B1 and B2, and a horizontal connecting line C1 which connects the sense electrodes B1 and B2 together to form a sense line. The second metal layer includes a vertical connecting line C2 which passes through the insulation layer and connects the drive electrodes A1 and A2 together to form a drive line. Both the vertical connecting line and the horizontal connecting line may be made of ITO, or be made of metal grids just like the drive electrodes A1 and A2 and the sense electrodes B1 and B2. For example, in particular in the second embodiment, the horizontal connecting line C1 is a metal grid and the vertical connecting line C2 is a ITO wiring The vertical connecting line or the horizontal connecting line is formed by metal grids, the benefits of which include: 1) a lower resistivity of the metal compared with ITO; and 2) preventing the vertical connecting line and the horizontal connecting line from impacting a display effect because the metal girds fall within the projection of the black matrix.

Furthermore, the ratio of the density of the metal grids forming the vertical connecting line and the horizontal connecting line to the density of the sub-pixels is 1:1, that is, one metal grid corresponds to one sub-pixel unit.

In another embodiment, the structure of the touch layer may be such that: the second metal layer includes drive electrodes, sense electrodes and a horizontal connecting line which connects a plurality of the drive electrodes together to form a drive line; and the first metal layer includes a vertical connecting line which passes through the insulation layer and connects a plurality of the sense electrodes together to form a sense line.

Alternatively, the first metal layer of the touch layer includes drive electrodes and a vertical connecting line which connects a plurality of the drive electrodes together to form a drive line; and the second metal layer includes sense electrodes and a horizontal connecting line which connects a plurality of the sense electrodes together to form a sense line.

Alternatively, the touch layer may have other structures, as long as the drive electrodes and/or the sense electrodes are metal grids and as long as the density of the metal grids adjacent to the edge direction of the metal grid electrodes is set to be larger than that of the metal grids adjacent to the center direction of metal grid electrodes.

It should be noted that only the preferred embodiments and the technical principle employed in the present invention have been described as above. It can be understood by those skilled in this art that the present invention is not limited to the above described specific embodiments. To those skilled in this art, various apparent modifications, rearrangements and substitutions can be made without departing from the protecting scope of the present invention. Therefore, although the present invention has been described through the above embodiments, the present invention is not limited to the above embodiments. Other further equivalent embodiments may be included without departing from the concept of the present invention. However, the scope of the present invention is defined by the appended claims.

What is claimed is:

1. An in-cell touch display device, comprising:
a color filter substrate,
a Thin Film Transistor array substrate, and
a liquid crystal layer disposed between the color filter substrate and the Thin Film Transistor array substrate,
wherein the color filter substrate comprises:
a grid black matrix layer,
a touch layer, and
a color filter layer;
wherein the touch layer comprises a plurality of metal grid electrodes, wherein each electrode is aligned with the grid of the black matrix layer in a light transmission direction, and wherein a density of the metal grid electrodes adjacent to the edge of the metal grid electrodes is greater than a density of the metal grid electrodes adjacent to the center of metal grid electrodes.

2. The in-cell touch display device of claim 1, wherein the density of the metal grid electrodes decreases gradually from the edge of the metal grid electrodes to the center of the metal grid electrodes.

3. The in-cell touch display device of claim 1, wherein the color filter comprises a plurality of sub-pixels, and a ratio of the density of the metal grid electrodes to the density of the sub-pixel units ranges from 1:1 to 1:12.

4. The in-cell touch display device of claim 1, wherein the touch layer comprises a horizontal connecting line and a vertical connecting line, wherein the horizontal connecting line and the vertical connecting line cross each other, and the horizontal connecting line and/or the vertical connecting line are formed by metal grids.

5. The in-cell touch display device of claim 4, wherein a ratio of the density of the metal grids of the horizontal connecting line and/or the vertical connecting line to the density of the sub-pixel units is 1:1.

6. The in-cell touch display device of claim 4, wherein the touch layer comprises a first metal layer, a second metal layer, and an insulation layer between the first metal layer and the second metal layer.

7. The in-cell touch display device of claim 6, wherein the first metal layer of the touch layer comprises drive electrodes, sense electrodes and a vertical connecting line which connects a plurality of the drive electrodes together as a drive line, and wherein the second metal layer comprises a horizontal connecting line which passes through the insulation layer and connects a plurality of the sense electrodes together as a sense line.

8. The in-cell touch display device of claim 6, wherein the second metal layer of the touch layer comprises drive electrodes, sense electrodes and a vertical connecting line which connects a plurality of the drive electrodes together as a drive line, and wherein the first metal layer comprises a horizontal connecting line which passes through the insulation layer and connects a plurality of the sense electrodes together as a sense line.

9. The in-cell touch display device of claim 6, wherein the first metal layer of the touch layer comprises drive electrodes and a vertical connecting line which connects a plurality of the drive electrodes together as a drive line, and wherein the second metal layer comprises sense electrodes and a horizontal connecting line which connects a plurality of the sense electrodes together as a sense line.

10. The in-cell touch display device of claim 1, wherein the line width of each metal grid ranges from 0.1 μm to 10 μm.

11. The in-cell touch display device of claim 1, wherein the shape of the each metal grid is a rectangle shape or a diamond shape.

12. The in-cell touch display device of claim 1, wherein the metal grid electrodes are drive electrodes and/or sense electrodes.

* * * * *